Patented Nov. 13, 1945

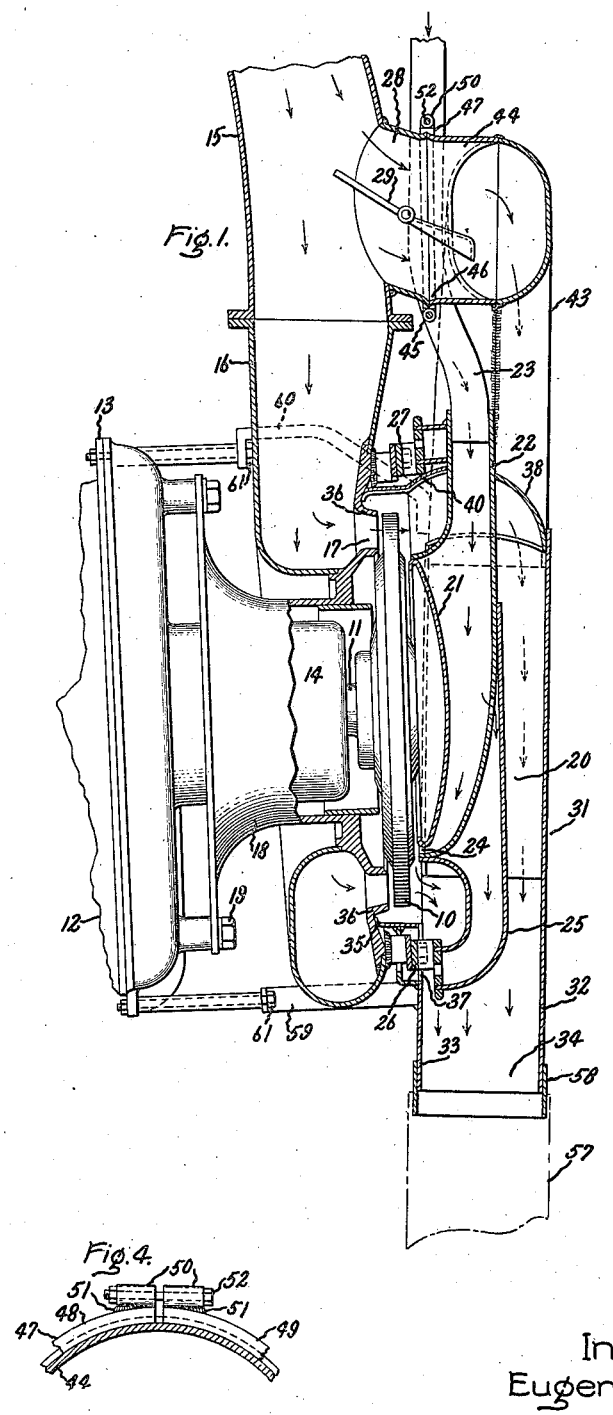

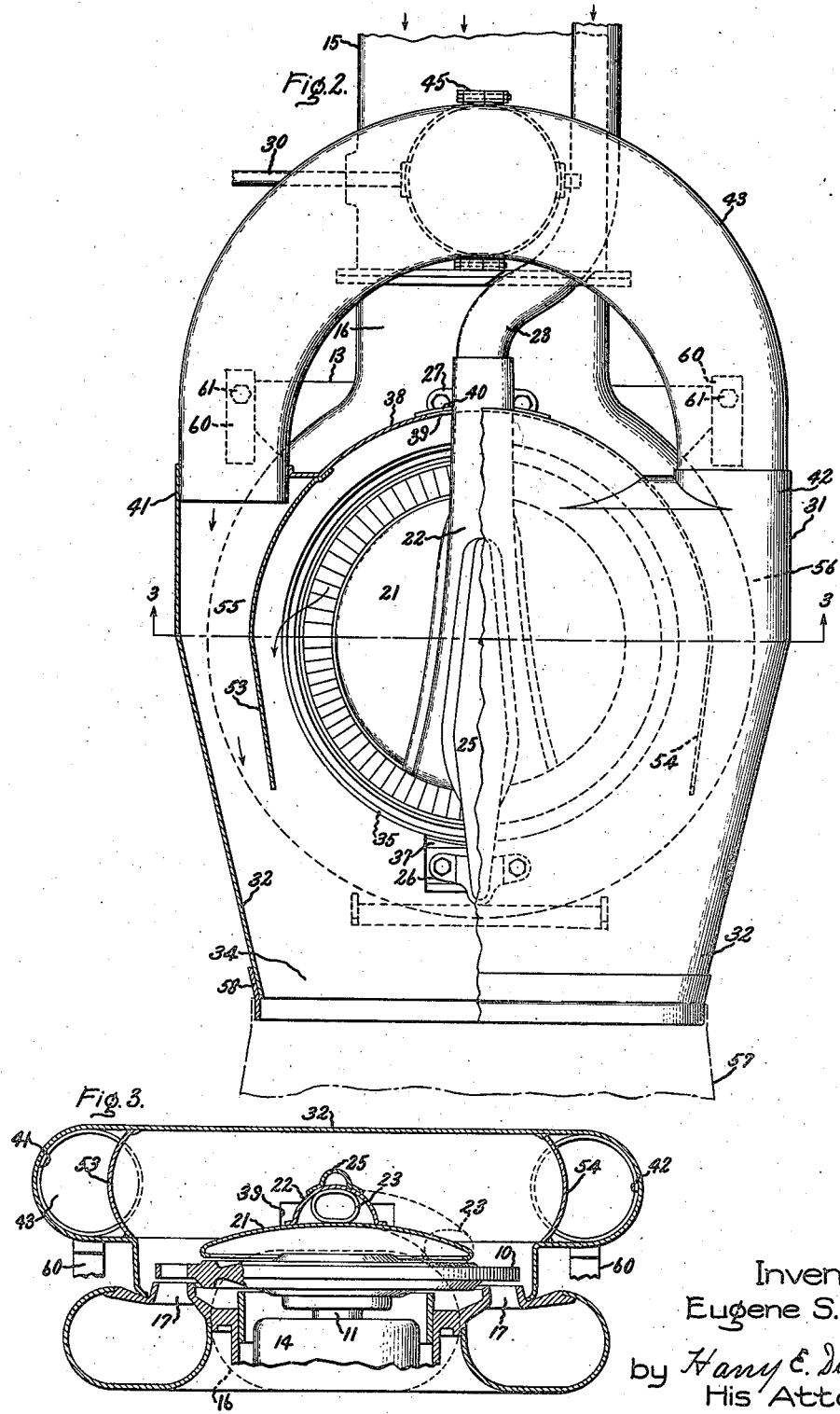

2,388,952

UNITED STATES PATENT OFFICE 2,388,952

AIRCRAFT GAS TURBINE ARRANGEMENT

Eugene S. Clark, Lynn, Mass., assignor to General Electric Company, a corporation of New York Application July 9, 1940, Serial No. 344,562

4 Claims. (Cl. 253—39)

The present invention relates to aircraft gas turbine arrangements such as are used for driving accessories, like blowers or compressors to supercharge internal combustion engines and cabins. More specifically the invention relates to flight hoods for conducting gases discharged from the gas turbine to the atmosphere.

Whenever aircraft gas turbines are operated with gases exhausted from the combustion engine, it is customary to provide the conduit for conducting gases from the exhaust manifold of the engine to the turbine with a valved waste gas conduit for discharging part of the gases directly into the atmosphere and for controlling such discharge in order to regulate the power output of the gas turbine. Difficulties have heretofore been experienced in conducting the waste gases to the atmosphere without causing injury to or without affecting apparatus in proximity to the waste gate.

The object of my invention is an improved construction and arrangement of flight hoods and waste gas discharge devices whereby the waste gases may be readily conducted to the atmosphere. This is accomplished in accordance with my invention by the provision of an improved flight hood and waste gas discharge arrangement whereby waste gases are discharged through the flight hood to the atmosphere without mixing with the turbine exhaust gases in proximity to the turbine.

For a better understanding of what I believe to be novel and my invention, attention is directed to the following description and the claims appended thereto in connection with the accompanying drawings.

In the drawings Fig. 1 is a view partly in section of an aircraft gas turbine arrangement embodying my invention; Fig. 2 is a front view of Fig. 1; Fig. 3 is a section along line 3—3 of Fig. 2; and Fig. 4 is an enlarged detail view of a part of Figs. 1 and 2.

The arrangement as shown in the drawings comprises a gas turbine having a single stage bucket wheel 10 secured to an overhung portion of a shaft 11 and arranged to drive a centrifugal type blower or compressor 12. The shaft 11 is supported on a bearing or bearing arrangement 14 located between the bucket wheel 10 and the compressor 12. Gases for operating the turbine are conducted from any suitable source such as the exhaust manifold of the combustion engine (not shown) by means of a flanged conduit 15 to a nozzle box 16 of the turbine. The latter is located between the turbine wheel and the compressor, surrounding in spaced relation the bearing 14, and having a row of nozzle blades 17 for directing gases to the wheel. In order to reduce the radiation of heat from the nozzle box to the bearing an annular curved baffle 18 is provided adjacent to the nozzle box surrounding the bearing 14 in spaced relation and secured to the compressor casing 13 by a plurality of bolts 19.

A device 20 for cooling and protecting the bucket wheel from the gases discharged therefrom is arranged adjacent the outlet side of the bucket wheel. The cooling and protecting device 20 comprises a cap 21 concave-shaped towards the wheel and having a rim portion in close proximity to the wheel. This cap prevents gases discharged from the wheel, more particularly from the leading portion thereof, from being forced towards the central portion of the wheel and causing excessive heating thereof. By a leading portion of the wheel I mean a portion facing the slipstream, it being assumed in this instance that the direction of the slipstream is in the direction of a diameter of the wheel, and that the arrangement is operated without a flighthood. The slipstream direction is marked by an arrow in Fig. 1 of the drawings. A streamlined conduit 22 is secured to the cap 21 across a diameter of the latter and has an inlet portion connected to a conduit 23 for receiving cooling medium, such as air, from the slipstream. The lower end portion of the conduit 22 and the cap 21 form a discharge opening 24 through which cooling air is discharged towards a trailing portion of the rim of the bucket wheel. An extension 25 of the cooling conduit 22 is detachably secured to and supported on the nozzle box 16 by means including brackets 26. The inlet portion of the conduit 22 is detachably supported on the nozzle box 16 by brackets 27. The arrangement so far described is more fully disclosed in the aforementioned application of C. W. Smith.

A part of the gases in the supply conduit 15 are discharged directly into the atmosphere, that is, bypassed with regard to the turbine through a waste gas conduit 28 including a waste gate or valve 29 connected to a control lever 30. Thus, during operation a part of the gases conducted through the conduit 15 is discharged through the waste conduit 28 and another part is conducted to the nozzle box 16 and directed towards the bucket wheel to be discharged therefrom to the atmosphere. According to my invention, as pointed out above, I provide a combined flight hood and waste gas discharge device 31 for conducting both the waste gas and the turbine exhaust gases to the atmosphere, at the same time precluding mixing of the two gases in proximity to the bucket wheel. A flighthood broadly constitutes a cover substantially enclosing the discharge side of the wheel, in the present instance also enclosing the protecting and cooling device for the wheel and forming a discharge opening in the direction of the slipstream so that the slipstream of the airplane mamy not interfere with the discharge of gases; on the contrary, with a flighthood properly designed it may aid the discharge of gases into the atmosphere. The flight hood proper constitutes a welded sheet metal construction having an outer wall 32 and an inner wall 33 welded together and forming a discharge opening 34 in the direction of the slipstream. The inner wall 33 has a cylindrical projection 35 surrounding the wheel 10 and with an edge portion biased towards a grooved portion 36 of the nozzle box 16. A central lower portion of the inner wall 33 has an opening 37 through which the brackets 26 project. An upper or forward curved portion 38 welded between the outer and inner walls has an opening 39 through which the inlet portion of the cooling conduit 22 projects. After assembly the opening 39 between the cooling conduit 22 and the grooved nozzle box portion 36 is closed by a strip of metal or closure member 40.

Upper or forward portions on opposite sides of the flight hood form openings 41 and 42 which according to my invention are connected to receive waste gas from the conduit 28 by means including a curved conduit 43 with end portions secured in the openings 41 and 42 and an upper central portion connected to an inlet conduit 44, the latter being secured to the conduit 28 by means of a connecting or coupling device 45. More specifically the conduits 28 and 44 have adjacent end portions 46 conically shaped or flared outward. These adjacent flared conduit end portions are engaged by a connecting ring 47 comprising two halves 48 and 49 with a continuous inner groove, V-shaped in cross section and in engagement with the flared end portions 46 (Fig. 4). In order to secure the two ring halves 48, 49 together and thereby securely to connect the conduits 28, 44, each end portion of each ring half is provided with an eye 50 integrally united with such end portions by a weld 51. The eyes 50 of the adjacent end portions of the ring halves 48 and 49 are detachably fastened together by a bolt 52. With this connecting device 45 the conduits 28, 44 may be readily assembled and dismantled.

It is desirable to prevent mixing of the waste gases with the turbine exhaust gas in proximity to the turbine wheel in order to prevent or reduce after-burning and consequent excessive temperatures near the turbine. To this end partitions or baffles 53 and 54 are provided on opposite sides of the wheel to define waste gas channels 55 and 56 respectively which constitute extensions of the channels defined by the end portions of the curved conduit 43. The upper edges of the partitions 53, 54 are sealed to the aforementioned wall portions 38. The lower edges of the partitions 53, 54 are located near the trailing portion of the bucket wheel, that is, near the discharge opening 34 of the flighthood.

During operation the gases exhausted from the bucket wheel are conducted to the atmosphere by the central or main channel defined between the outer and inner walls 32, 33 of the flighthood and the partitions 53, 54. Waste gases discharged during operation through the waste gate conduit 28 are conducted to the atmosphere through a channel defined by the conduit 44, the two halves of the conduit 43, and the secondary or auxiliary channels 55, 56. Upon leaving these secondary channels the waste gases may mix with the turbine exhaust gases. Such mixing, however, takes place only beyond the trailing portion of the turbine wheel. The various channels are symmetrically arranged with regard to a diameter of the bucket wheel.

The gases discharged from the opening 34 of the flight hood may be confined within a channel 57 indicated in dash-dotted lines and connected to the discharge end of the flighthood by means including a connecting sleeve 58 to a point in the rear of the aircraft.

The combined flighthood and waste gas discharge device is detachably supported on the flanged compressor casing 13 by means of brackets 59 and 60 fused to the flighthood structure and bolted to the flanged casing 13 by bolts 61.

With this arrangement the weight of the flighthood is entirely carried by the casing 13 and the load on the nozzle box 16 is reduced to a minimum. The box carries only the cooling device 20. The separate supports for the cooling device and the flighthood permit adjustment of the running clearance between the cooling cap 21 and the bucket wheel without affecting the flighthood. Likewise, the flighthood may be adjusted without affecting the adjustment of the cooling device 20.

Having described the method of operation of my invention, together with the apparatus which I now consider to represent the best embodiment thereof, I desire to have it understood that the apparatus shown is only illustrative and that the invention may be carried out by other means.

What I claim as new and desire to secure by Letters Patent of the United States is:

1. Aircraft gas turbine arrangement comprising a gas turbine having a bucket wheel mounted with its axis substantially perpendicular to the direction of the slipstream and a nozzle box for conducting gases to the wheel, a conduit for conducting gases to the nozzle box having a valved waste gas conduit for bypassing gases with regard to the nozzle box, and a combined flighthood and waste gas discharge device enclosing the discharge side of the wheel for discharging gases from the waste gas conduit and the bucket wheel to the atmosphere, said flighthood having a discharge opening located beyond the trailing portion of the wheel and an inlet opening radially outward from the leading portion of the wheel and connected to said conduit and a partition to form separate channels for receiving gases issuing from the wheel and waste gases from said conduit to preclude mixing of these gases in proximity to the wheel.

2. Aircraft gas turbine arrangement comprising a gas turbine having a bucket wheel mounted with its axis substantially perpendicular to the direction of the slipstream and a nozzle box, means including a waste gas conduit for conducting gases to the nozzle box and bypassing gas with regard to the nozzle box, and a combined flighthood and waste gas discharge device for discharging gases from the bucket wheel and the waste gate conduit to the atmosphere, said device including a flighthood proper having inner and outer walls with a partition to form a main and a secondary channel with the main channel arranged to receive exhaust gases from the turbine, and means connecting the waste conduit to the secondary channel, said channel having outlets connected in parallel at a point near the trailing portion of the wheel to preclude mixing of the gases in proximity to the wheel.

3. Aircraft gas turbine arrangement comprising a gas turbine having a bucket wheel and a nozzle box for conducting gases to the wheel, conduit means having a valved waste gas conduit for conducting gases to the nozzle box, and a combined flighthood and waste gas discharge device for discharging the gases from the waste gate and the bucket wheel to the atmosphere, said device comprising a flighthood proper having inner and outer walls and partitions on opposite sides to define a main channel for receiving gases exhausted from the turbine and auxiliary channels, and conduit means connecting the waste gas conduit to the auxiliary channels.

4. Aircraft gas turbine arrangement comprising a gas turbine having a bucket wheel and a nozzle box for conducting gases to the wheel, conduit means having a valved waste gas conduit for conducting gases to the nozzle box, a combined flighthood and waste gas discharge device with a partition to form separate channels, one channel for receiving gases from the waste gate and the other for receiving gases from the bucket wheel and conduct them to the atmosphere, the device having an outlet radially outward of the wheel and facing rearward when viewed in the direction of the slipstream, a coupling means detachably connecting the device to the waste gas conduit, and adjustable means for supporting the device so that a minimum load is carried by the nozzle box.

EUGENE S. CLARK.